Dec. 20, 1960   D. P. MARQUIS   2,964,928
UNIVERSAL JOINT
Filed Jan. 4, 1960

INVENTOR.
Donald P. Marquis
BY
L. D. Burch
ATTORNEY

United States Patent Office 2,964,928
Patented Dec. 20, 1960

2,964,928

UNIVERSAL JOINT

Donald Peter Marquis, Saginaw, Mich., assignor to General Motors Corporation, Detroit, Mich., a corporation of Delaware Filed Jan. 4, 1960, Ser. No. 282

3 Claims. (Cl. 64—8)

This invention relates to universal joints and more particularly to a double pot type universal joint, having centering means therein to provide a nearly constant velocity as well as axial slip, to permit relative changes in length of the propeller shaft.

In motor vehicle drivelines it is desirable to provide a construction which will provide constant angular velocity with respect to the input and output ends thereof. This is normally accomplished by utilizing several universal joints, phased in such a manner as to provide this condition at opposite ends of the propeller shaft.

It is becoming increasingly popular to position drivelines in motor vehicles to lower the vehicle floor and eliminate the interior tunnel as much as possible. This is generally accomplished by using three universal joints, one of which being a constant velocity universal joint and the remaining joints non-constant velocity universal joints which must be phased in the proper manner to obtain constant velocity at opposite ends of the shaft. In most installations of this nature, the constant velocity universal joint is generally a double Cardan type universal joint which is relatively expensive to manufacture.

A further problem that must be overcome is the changing of the effective length of the driveline, due to changes in position of the rear axle. This is usually accomplished by providing a sliding spline joint somewhere in the driveline, such as at one of the universal joints. A construction of this kind thus requires a separate joint, which is expensive and complex in production and assembly.

The device in which this invention is embodied comprises, generally, a double pot type universal joint which gives nearly constant velocity, yet provides means for accommodating relative changes in length of the propeller shaft due to changes in position of the rear axle and associated parts. The joint includes centering means in which a yoke extends from one shaft portion and has a spherical ball mounted in between the ends of the arms thereof, and a slotted shaft extension, formed from the other of the drive shaft sections, slidingly receives the spherical ball. One of the drive shaft sections is positively located within the universal joint housing, and the other shaft portion is permitted to move axially of the housing, taking up changes in length of the driveline.

With a device of this nature, which is relatively inexpensive to manufacture and provides a much higher degree of angularity than the double Cardan universal joint, a driveline construction may be made which further lowers the vehicle floor and aids in eliminating the objectionable tunnel. Since the universal joint is less expensive, and adapted to a wider variety of usages, the field of motor vehicle design is greatly expanded.

These and other advantages will become more apparent from the following description and drawings in which.

Figure 1:
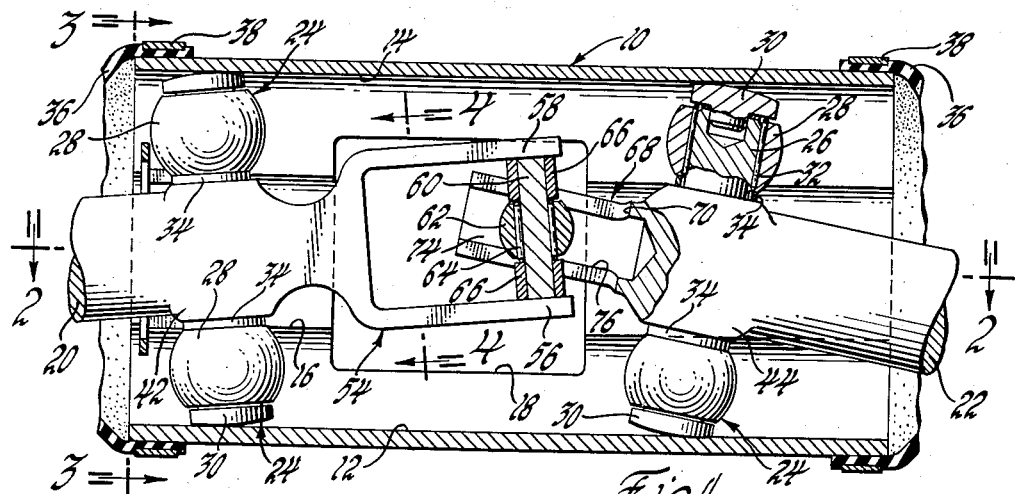
Figure 1 is an elevational view of the universal joint with parts broken away and in section to illustrate the position of the various parts.
Figure 2:
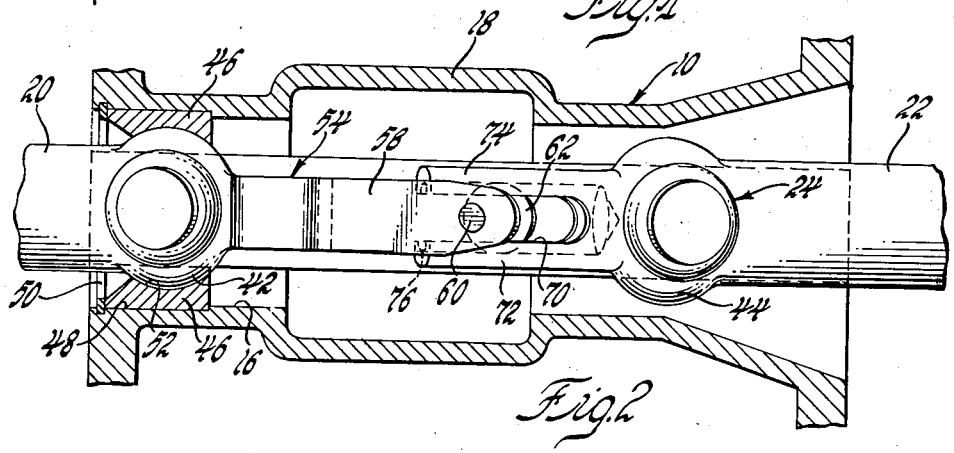
Figure 2 is a cross-sectional view of the universal joint illustrated in Figure 1, taken substantially along the line 2—2 of Figure 1 and looking in the direction of the arrows.
Figures 3, 4:
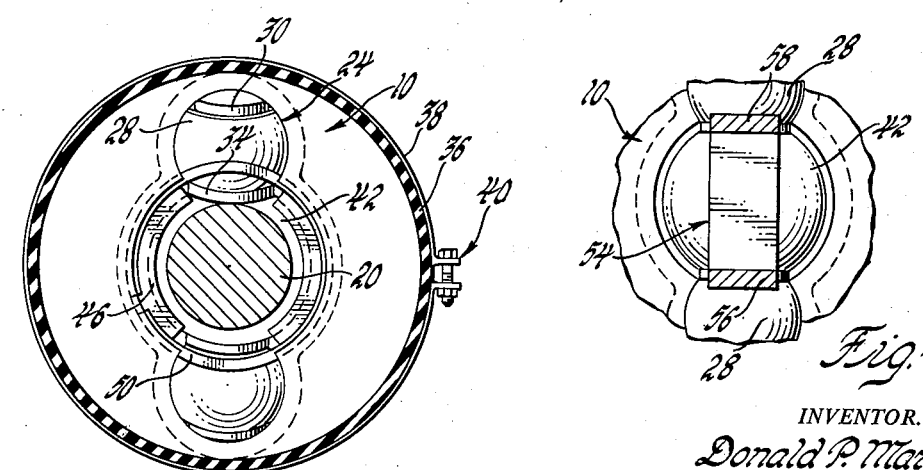
Figure 3 is an end view of the universal joint illustrated in Figure 1, taken substantially along the line 3—3 of Figure 1 and looking in the direction of the arrows.
Figure 4 is a view of a portion of the universal joint set forth in Figure 1, taken substantially along the line 4—4 of Figure 1 and looking in the direction of the arrows.

Referring more particularly to the drawings, the universal joint is best illustrated in Figures 1 and 2. A pot, or housing, illustrated generally by the numeral 10, has a plurality of axial openings, or bores, 12, 14 and 16, respectively, extending lengthwise thereof. The openings or bores may be formed in the housing by broaching or boring, or in any other manner suitable to provide bearing surfaces and sufficient tolerances in the bores 12 and 14. The housing 10 may have an enlarged portion 18, formed approximately centrally thereof, the purpose of which will be later described.

Propeller shaft sections 20 and 22 extend into the housing 10 and into the central bore 16. A trunnion and bearing assembly, illustrated generally by the numeral 24, is secured in the end of each shaft section 20 and 22. The trunnion and bearing assembly 24 comprises a crosspin 26 extending through the shaft and carrying a bearing sleeve 28 and a bearing cap 30. An annulus of needle bearings 32 is disposed between the crosspin 26 and the bearing sleeve 28 to assure relatively frictionless rotation of the bearing sleeve 28 about the crosspin 26. A retaining ring, or the like, 34 is received about the crosspin 26 and abuts the bearing sleeve 28 to properly position the bearings 32 with respect to the shaft 22 and the crosspin 26.

In order to prevent lubrication from leaking out of the universal joint housing 10, and to prevent the entry of dirt and other foreign material into the housing, boots 36 are provided at each end of the housing. The boots may be of the corrugated rubber type, extending down to and surrounding the shaft portions 20 and 22. Retaining rings 38 clamp the boots to the housing 10 and may be securely tightened, as by the nut and bolt assembly 40.

The input and output shafts 20 and 22 are provided with generally spherical enlargements 42 and 44 within the housing 10. A pair of shoes 46 are received in an annular groove 48, formed near one end of the housing 10, and are retained therein by a suitable retaining ring 50. The shoes 46 are formed to provide generally spherical depressions 52 which are complementary to the shape of the spherical enlargement 42 on the shaft portion 20. The shoes 46 receive the enlargement 42 of the shaft portion 20 and, because of their positive location in the bore 16, prevent any relative axial movement between the shaft portion 20 and the housing 10. At the same time, since the depressions 52 and the enlargement 42 are generally spherical in shape, the shaft portion 20 is allowed angular movement relative to the housing 10 within the limits defined by the opening of the central bore 16. It may be noted in this same connection that the enlargement 44 of shaft portion 22 is not positively located within the housing 10. The purpose for this will be later described.

Extending from the enlargement 42 of shaft portion 20 is a yoke, illustrated generally by the numeral 54, having yoke arms 56 and 58. The yoke arms extend toward the shaft portion 22 and a crosspin 60 is secured to, and extends between, the arms 56 and 58. A generally spherical ball 62 is received about the crosspin 60 and an annulus of needle bearings or the like 64, disposed between the crosspin and the spherical ball 62, permit relatively frictionless rotation of the ball about the crosspin 60. A pair of spacer sleeves 66 are disposed between the inner surfaces of the yoke arms 56 and 58 and the ball 62, to locate the ball 62 in a generally central position on the crosspin 60 and at the same time to retain the annulus of needle bearings 64 in the proper position.

Extending from the enlargement 44 of shaft portion 22 is a slotted shaft extension, illustrated generally by the numeral 68. The extension is generally cylindrical in shape and has a slot 70 formed therethrough to provide extending arms 72 and 74. The extending arms are each provided with generally spherical grooves 76 along the inner surfaces thereof and complementary in shape to the spherical ball 62 on the crosspin 60. The shaft extension 68 receives the spherical ball 62 and is permitted relative movement with respect thereto, while at all times maintaining contact with the ball.

The operation of the universal joint is as follows: During normal vehicle operation, and assuming for descriptive purposes that the shaft members 20 and 22 are axially aligned, it may be seen that rotation imparted to the shaft portion 20 by the vehicle power plant causes rotation of the housing 10, because of the trunnion and bearing assembly 24. Rotation of the housing 10 thus causes rotation of the shaft portion 22, because of its associated trunnion and bearing assembly 24. The rotation and torque is transmitted to the final drive portion of the motor vehicle.

When it is necessary for the angulation between the two shaft portions 20 and 22 to change, such as might be caused by the vehicle hitting a bump, or because of the permanent configuration of the driveline, the parts might assume a position such as illustrated in Figure 1. It may be seen that rotation of the drive shaft portion 20 again causes rotation of the housing 10 and rotation of the shaft portion 22, the universal motion being provided by the action of the spherical ball 62 within the slot 70 of the shaft extension 68. The housing enlargement 18 may be provided in order to accommodate a large angle between the input and output shafts and to permit the centering means, including the yoke 54, crosspin 60, ball 62 and shaft extension 68, to gyrate freely within the housing 10.

In situations where the effective length of the driveline must be lengthened or shortened, such as may be caused by the rear wheels passing over an obstruction or the like, it is necessary for one of the shaft portions to move axially with respect to the other. Since the shaft portion 20 is fixed by the shoes 46 there can be no axial movement of that portion. However, shaft portion 22 is free to move axially, within the limits defined by the length of the shaft extension 68 and the length of the housing 10. As may be seen from viewing Figure 1, movement to the right or to the left of shaft portion 22 will not change the center of gyration of the center of the spherical ball 62. Thus, extremely little, although some, change in the angular velocity transmitted through the joint will be evident, but for all practical purposes the joint maintains its near constant velocity.

Thus, it may be seen that a double pot type universal joint is provided which is practically constant velocity transmitting and still permits changing of the effective length of the overall driveline by permitting axial movement of one of the shaft members associated therewith.

What is claimed:

1. A universal joint comprising a housing having a plurality of axially disposed communicating openings formed therethrough, first and second shafts extending into one of said openings in said housing, trunnion and bearing assemblies secured in said shafts within said housing and extending into the others of said openings, a yoke formed on the end of said first shaft and extending toward said second shaft, a crosspin secured in the arms of said yoke and extending therebetween, a spherical ball rotatably secured on said crosspin and spaced between the ends thereof, a slotted shaft extension extending from said second shaft and toward said first shaft and slidably receiving said spherical ball to permit the distance between said first and second shafts to change, and means for locating said first shaft in said housing to eliminate axial movement thereof within said housing.

2. A universal joint comprising a housing having a plurality of axially disposed openings formed therethrough, first and second shafts extending into one of said openings in said housing, a trunnion and bearing assembly secured in each of said shafts and within said housing and extending into the others of said openings in said housing, a yoke extending from said first shaft and toward said second shaft and within said housing, a crosspin secured in the arms of said yoke and extending therebetween, a spherical ball rotatably mounted on said crosspin and between the ends thereof, a slotted shaft extending from the end of said second shaft and receiving said spherical ball, said second shaft being axially movable within said housing and about said ball, a pair of shoes mounted in said housing and engaging said first shaft to fix said shaft in axial location within said housing and permit angular movement thereof, said angular movement being imparted to said second shaft by said spherical ball engaging said shaft extension on said second shaft.

3. Centering means for a double pot type universal joint having a housing and first and second shafts extending into said housing, said first and second shafts having trunnion and bearing assemblies secured near the ends thereof within said housing, said centering means comprising a yoke extending from said first shaft and toward said second shaft, a crosspin secured in the arms of said yoke and extending therebetween, a spherical ball rotatably mounted on said crosspin and intermediate the ends thereof, spacer means on said crosspin and between said yoke arms and said ball to prevent movement of said ball along said crosspin, a slotted shaft extension formed from said second shaft and extending toward said first shaft, said extension slidably receiving said ball therein, said first shaft being permitted angular movement relative to said housing, said angular movement being imparted to said second shaft by said ball and said shaft extension to give universal motion to said shafts.

References Cited in the file of this patent

UNITED STATES PATENTS

| 2,186,846 | Trbojevich | Jan. 9, 1940 |
| 2,329,903 | Horne | Sept. 21, 1943 |

FOREIGN PATENTS

| 596,945 | Great Britain | Jan. 14, 1948 |